United States Patent
Wasniewski et al.

(10) Patent No.: US 12,442,245 B2
(45) Date of Patent: Oct. 14, 2025

(54) LAMINATED DOOR CORE FOR USE IN FIRE RATED DOORS AND ASSOCIATED METHODS

(71) Applicant: LEXINGTON MANUFACTURING LLC, Brainerd, MN (US)

(72) Inventors: Lance Wasniewski, Ironton, MN (US); Andre Fortin, Hatley Township (CA)

(73) Assignee: Lexington Manufacturing, LLC, Brainerd, MN (US)

( * ) Notice: Subject to any disclaimer, the term of this patent is extended or adjusted under 35 U.S.C. 154(b) by 661 days.

(21) Appl. No.: 17/547,883

(22) Filed: Dec. 10, 2021

(65) Prior Publication Data
US 2022/0186553 A1 Jun. 16, 2022

Related U.S. Application Data

(60) Provisional application No. 63/124,473, filed on Dec. 11, 2020.

(51) Int. Cl.
| | |
|---|---|
| *B32B 3/10* | (2006.01) |
| *B32B 7/12* | (2006.01) |
| *B32B 19/04* | (2006.01) |
| *B32B 21/02* | (2006.01) |
| *B32B 21/10* | (2006.01) |
| *E06B 5/16* | (2006.01) |

(52) U.S. Cl.
CPC .................. *E06B 5/16* (2013.01); *B32B 7/12* (2013.01); *B32B 19/042* (2013.01); *B32B 21/02* (2013.01); *B32B 21/10* (2013.01); *B32B 2250/05* (2013.01); *B32B 2250/40* (2013.01); *B32B 2262/101* (2013.01); *B32B 2264/067* (2013.01); *B32B 2307/3065* (2013.01); *B32B 2419/00* (2013.01)

(58) Field of Classification Search
None
See application file for complete search history.

(56) References Cited

U.S. PATENT DOCUMENTS

| | | | |
|---|---|---|---|
| 4,203,255 A | 5/1980 | Naslund et al. | |
| 4,364,987 A | 12/1982 | Goodwin | |
| 4,489,121 A * | 12/1984 | Luckanuck | B32B 21/13 |
| | | | 428/326 |
| 6,554,893 B2 | 4/2003 | Klus | |
| 7,669,383 B2 | 3/2010 | Darnell | |
| 2005/0031843 A1* | 2/2005 | Robinson | B32B 33/00 |
| | | | 428/921 |

(Continued)

*Primary Examiner* — Christopher M Polley
(74) *Attorney, Agent, or Firm* — ALLEN, DYER, DOPPELT & GILCHIRST, P.A.

(57) ABSTRACT

A laminated door core for use in fire rated doors includes a center layer having a first side and an opposing second side, where the center layer comprises fire rated particleboard. The laminated door core also includes a first layer comprising calcium silicate adhered to the first side of the center layer, a second layer comprising calcium silicate adhered to the second side of the center layer, a first layer of high-density fiberboard adhered over the first layer of calcium silicate, and a second layer of high-density fiberboard adhered over the second layer of calcium silicate. A vertical stile may be positioned along each opposing longitudinal edge of the laminated door core, and a horizontal rail may be positioned along each of a top end and a bottom end of the laminated door core.

14 Claims, 3 Drawing Sheets

(56) References Cited

U.S. PATENT DOCUMENTS

2009/0241465 A1\* 10/2009 Majors ...................... E06B 1/30
52/784.11
2013/0228271 A1\* 9/2013 Garrett ................... B32B 37/24
156/242

\* cited by examiner

LAMINATED DOOR CORE FOR USE IN FIRE RATED DOORS AND ASSOCIATED METHODS

CROSS-REFERENCE TO RELATED APPLICATIONS

This application claims priority to U.S. Provisional Application Ser. No. 63/124,473 filed on Dec. 11, 2020, and the contents of which are herein incorporated by reference in their entirety.

FIELD OF THE INVENTION

The present invention relates to the field of doors, and more particularly to a laminated door core for use in fire rated doors.

BACKGROUND

Typical door construction includes a core, wood stiles and rails attached around the core, and thin facing material covering both sides of the door for its appearance. Building codes require that certain doors must meet or exceed a particular fire rating that is measured in time, such as a 20-minute door, a 45-minute door, a one-hour door, or one-and-a-half-hour door. Doors are given a fire rating in accordance with a standard test specification. The time that a door can withstand the heat before it is penetrated by burning determines its fire rating. Fire doors are used in residential and commercial buildings and provide fire protection between areas of a structure.

The cost of fabrication of a fire door is a consideration along with the fire-resistant characteristics. The weight of the fire door is also taken into consideration in the handling and transportation. Fire doors may be constructed of wood, steel, or mineral materials, for example. Fire doors were initially wooden cores with a layer of metal. These types of doors are heavy and expensive to fabricate.

Subsequently, fire-resistant cores for the fire doors were constructed using materials such as fiberglass instead of wood, for example. Other fire doors have included conventional gypsum panels as a core material. However, the gypsum panels are required to be relatively thick in order to meet the fire-resistant ability. In addition, the thick gypsum panels make the fire door very heavy. Also, gypsum begins to lose its fire-resistant capabilities and strength when exposed to high temperatures during a fire. This in turn reduces the fire resistance and structural integrity of the fire door having a homogenous gypsum core. Moreover, fabricating a fire door with thick gypsum panels is difficult in a facility where the tools are intended for wood working rather than for cutting mineral based materials.

Accordingly, there is a need for an improved door core for use in fire rated doers that is easy to assemble and manufacture using techniques well-known in the art. In addition, there is a need for a door core that is fire-resistant but can also maintain its strength and integrity after being exposed to heat of a fire. The door core should be lighter than present fire door cores.

SUMMARY

A fire rated door is disclosed and includes a laminated door core. The laminated door core includes a center layer having a first side and an opposing second side and is comprised of fire rated wood. The laminated door core also includes a first layer comprising a mineral material adhered to the first side of the center layer, and a second layer comprising the mineral material adhered to the second side of the center layer. In addition, laminated door core includes a first layer of high-density fiberboard adhered over the first layer of the mineral material, and a second layer of high-density fiberboard adhered over the second layer of the mineral material.

The fire rated door may include a vertical stile positioned along each opposing longitudinal edges of the laminated door core, and a horizontal rail, positioned along each of a top end and a bottom end of the laminated door core. The mineral material may be comprised of calcium silicate, fiberglass, or gypsum.

The fire rated door may also include a first door skin adhered over the first layer of high-density fiberboard, and a second door skin adhered over the second layer of high-density fiberboard. In addition, the fire rated wood of the center layer may comprise fire rated particleboard and also include a door jamb.

In another particular aspect, a laminated door core for use in fire rated doors is disclosed. The laminated door core includes a center layer having a first side and an opposing second side, where the center layer comprises fire rated particleboard. The laminated door core also includes a first layer comprising calcium silicate adhered to the first side of the center layer, a second layer comprising calcium silicate adhered to the second side of the center layer, a first layer of high-density fiberboard adhered over the first layer of calcium silicate, and a second layer of high-density fiberboard adhered over the second layer of calcium silicate.

In another particular aspect, a method of manufacturing a laminated door core for use in fire rated doors is disclosed. The method includes providing a center layer having a first side and an opposing second side, where the center layer comprises wood. The method includes adhering a first layer comprising a mineral material to the first side of the center layer, adhering a second layer comprising the mineral material to the second side of the center layer, adhering a first layer of high-density fiberboard over the first layer of the mineral material, and adhering a second layer of the mineral material over the second layer of calcium silicate.

The method may also include attaching a vertical stile along each opposing longitudinal edges of the laminated door core and attaching a horizontal rail along a top end and along a bottom end of the laminated door core. The method may include adhering a first door skin over the first layer of high-density fiberboard and adhering a second door skin over the second layer of high-density fiberboard.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention t;o those skilled in the art. Like numbers refer to like elements throughout.

Figure 1:
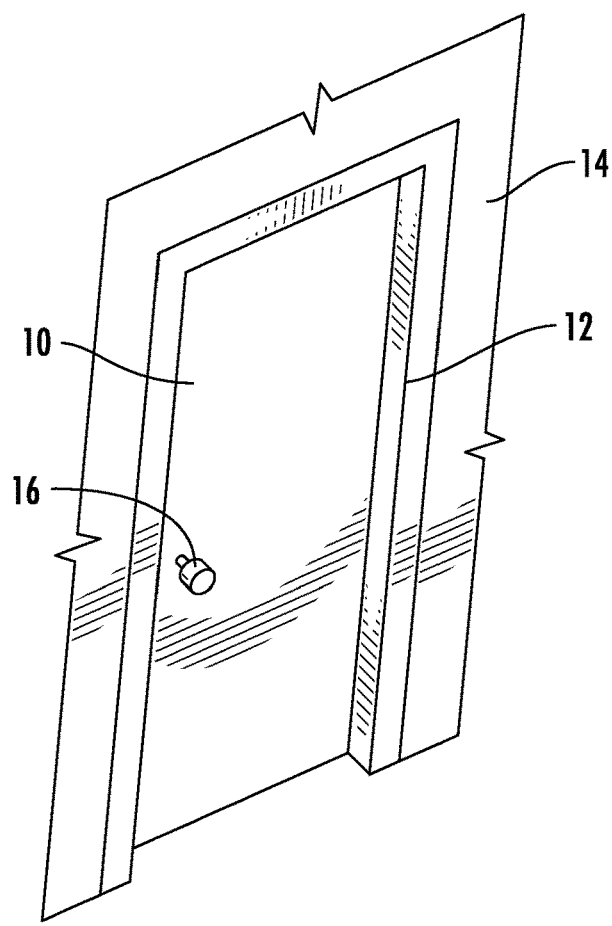
FIG. 1 is a perspective schematic view of a fire rated door installed within a door jamb in which various aspects of the disclosure may be implemented.

Fire rated doors are required for key areas in schools, hotels, and most other public spaces. A fire rated door 10 of the present invention is illustrated in FIG. 1. The fire rated door 10 is installed within a door jamb 12 that is secured within a wall 14. The fire rated doer 10 opens and closes using a door handle 16.

Figure 2:
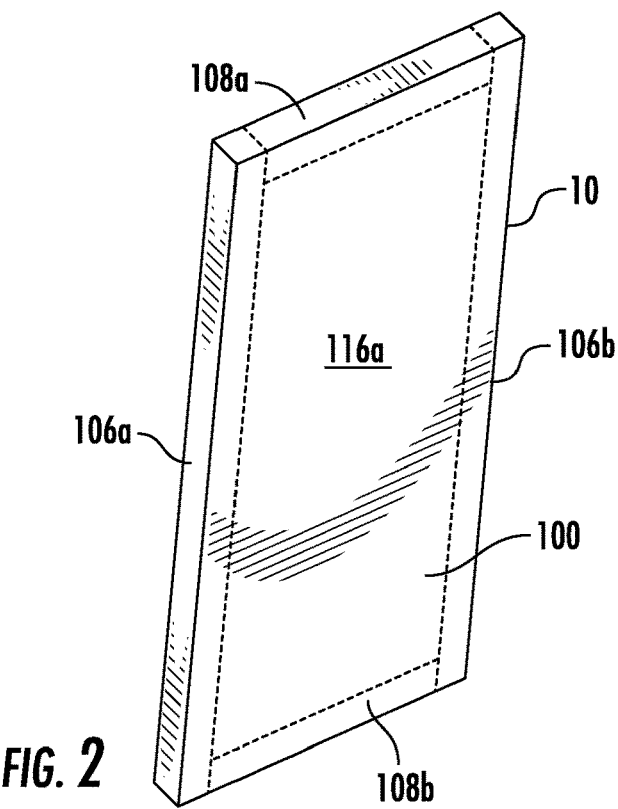
FIG. 2 is a perspective schematic view of the fire rated door of FIG. 1.

The fire rated door 10 includes a laminated door core 100 that is made of non-combustible materials to slow the spread of fire and smoke from one part of a building to another. The laminated door core 100 of the fire rated door 10 is covered with a door skin on each side. For example, door skin 116a is shown on the front side of the fire rated door 10 in FIC, 2. In addition, the laminated door core 100 is bounded along a top end and a bottom end by horizontal rails 108a, 108b, and along opposing longitudinal edge by vertical stiles to form the fire rated door 10. The horizontal rail 108a is visible in FIG. 2 positioned along the top of the laminated door core and the vertical stile 106a is visible positioned along the longitudinal edge of the laminated door core forming the boundary for the fire rated door 10.

The laminated door core 100 of the present invention is an improvement over the existing door cores that comprise a uniform, homogenous mineral material such fiberglass, gypsum, or calcium silicate for example. In contrast to the existing door cores, the present invention comprises a plurality of laminated materials as described below.

Figure 3:
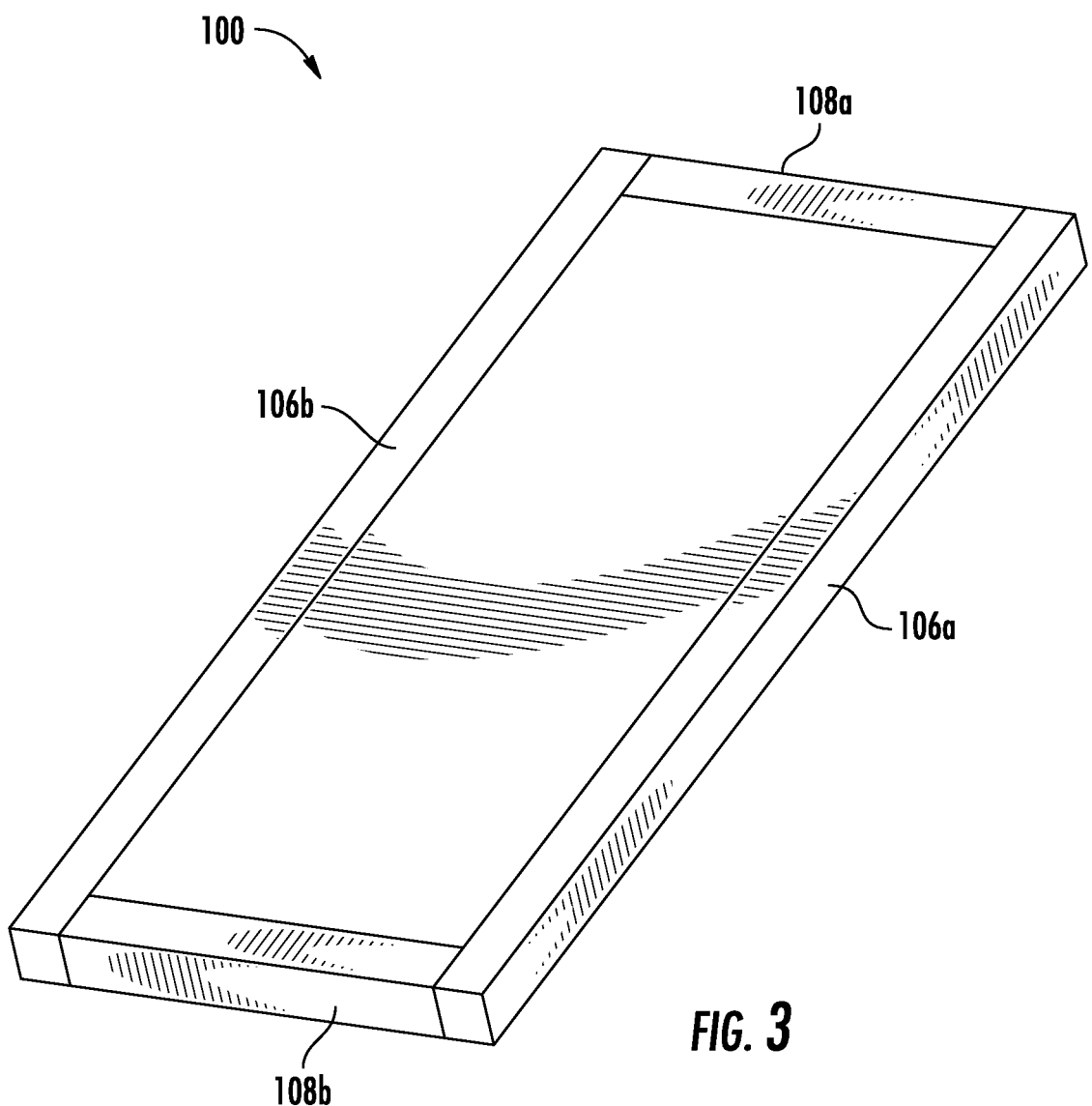
FIG. 3 is a perspective schematic view of a laminated door core of the fire rated door of FIG. 1.

Referring now to FIG. 3, a perspective view of the laminated door core 100 of the fire rated door 10 of the present invention is shown without the door skin for clarity. The laminated door core 100 is typically positioned with the vertical stiles 106a, 106b along the opposing longitudinal edges of the laminated door core 100, and horizontal rails 108a, 106b along opposing top and bottom ends of the laminated door core 100.

Figure 4:
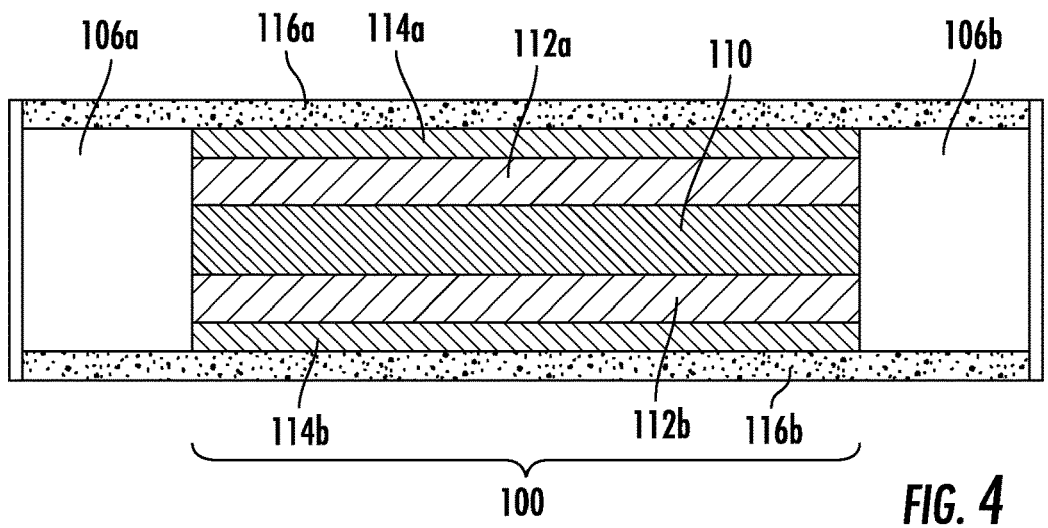
FIG. 4 is a cross sectional view of the laminated door core and stiles of FIG. 3, and a door skin secured thereto.
Figure 5:
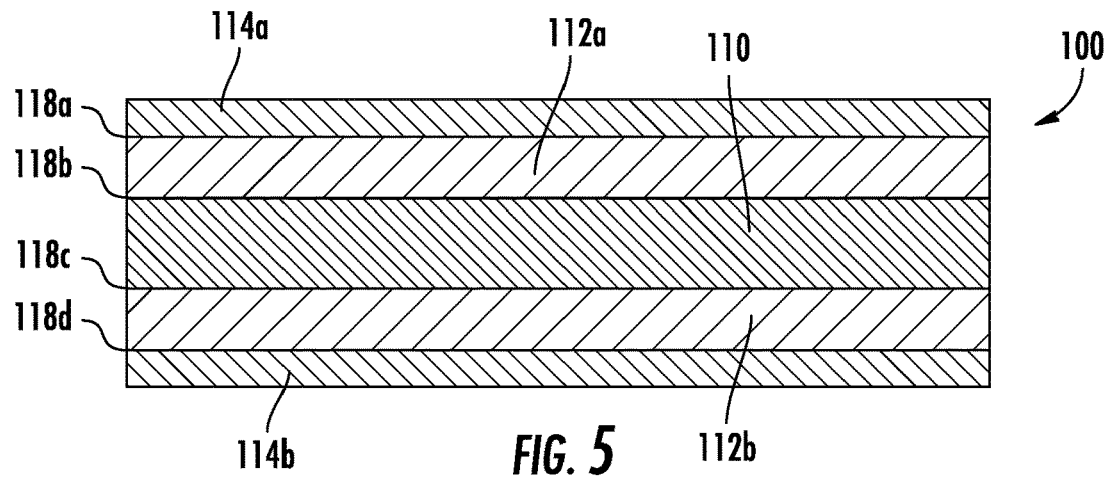
FIG. 5 is a cross sectional view of the laminated door core of FIG. 3.

Referring now to FIGS. 4 and 5, a schematic of a cross section of the laminated door core 100 is depicted. FIG. 4 includes the vertical stiles 106a, 106b and door skins 116a, 116b adhered to the laminated door core 100. FIG. 5 is just the laminated door core 100.

In particular, FIG. 4 illustrates the plurality of layers that are adhered together to form the laminated door core 100. A. center layer 110 of the laminated door core 100 comprises a fire rated particleboard. The center layer may have a thickness of 12 to 13 millimeters. On either side of the center layer 110, are layers of calcium silicate 112a, 112b adhered to the center layer 110. The thickness of the calcium silicate is less than in typical fire rated doors that have a homogenous make-up through the thickness of the entire door core. For example, the thickness of each layer of the calcium silicate 112a, 112b may be eleven to twelve millimeters. As those of ordinary skill in the art can appreciate, the calcium silicate layers 112a, 112b may be replaced with any similar mineral material, or combination of mineral materials, such as fiberglass or gypsum, for example, having fire resistive characteristics.

Accordingly, the cost of the laminated door core 100 is less than a typical door core because the overall thickness of the two layers of calcium silicate that are described by the present laminated door core 100 compared to the thickness of a homogenous door core is reduced. Moreover, having a reduced overall thickness of the mineral layer of the calcium silicate makes the laminated door core 100 easier to work with by being able to use typical wood working tools and methods.

The laminated door core 100 also includes a high-density fiberboard 114a, 114b laminated on top of each calcium silicate layer 112a, 112b. Each layer of the high-density fiberboard 114a, 114b may be two to three millimeters and sanded flush to the vertical stiles 106a, 106b. All the layers are adhered together using a door adhesive 118a, 118b, 118c, 118d between each of the layers to form the laminated door core 100. The customer can then easily apply a desired door skin 116a, 116b over the respective high-density fiberboard 114a, 114b as shown in FIG. 4 to finish the fire rated door 10 door as desired.

Figure 6:
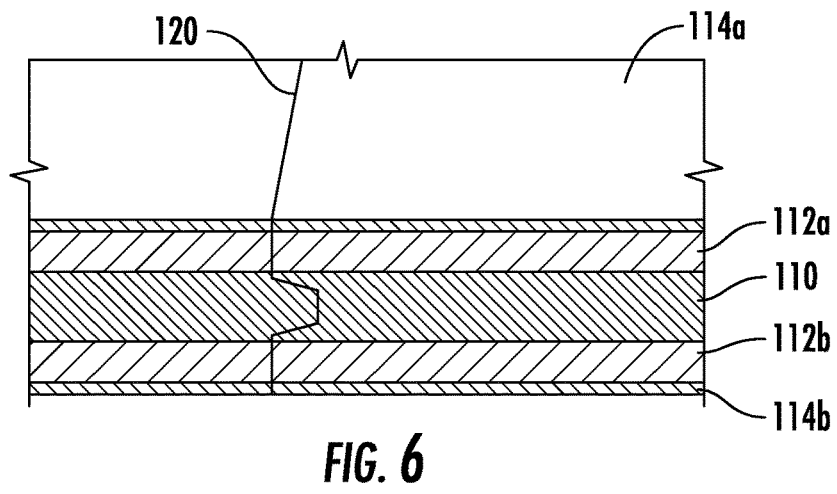
FIG. 6 is an end view of the laminated door core having a core joint.

Referring now to FIG. 6, an end view of the laminated door core 100 is depicted having a core joint 120. The core joint 120 is of no particular design or profile as those of ordinary skill in the art can appreciate that there are many types of core joints that may be implemented in manufacture of the laminated door core 100. The core joint 120 is used to secure together the various components of the lamented door core 100 using smaller pieces as needed. This provides additional flexibility and cost savings in assembling the laminated door core 100.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fire rated door comprising:
   a laminated door core, the laminated door core comprising,
   a center layer having a first side and an opposing second side, the center layer comprising fire rated wood,
   a first layer comprising a mineral material adhered to the first side of the center layer,
   a second layer comprising the mineral material adhered to the second side of the center layer,
   a first layer of high-density fiberboard adhered over the first layer of the mineral material, and
   a second layer of high-density fiberboard adhered over the second layer of the mineral material;
   wherein the center layer, the first layer of mineral material, and the second layer of mineral material each have approximately the same thickness.

2. The fire rated door of claim 1, further comprising a vertical stile positioned along opposing longitudinal edges of the laminated door core.

3. The fire rated door of claim 2, further comprising a horizontal rail positioned along opposing top and bottom ends of the laminated door core.

4. The fire rated door of claim 1, wherein the mineral material comprises calcium silicate.

5. The fire rated door of claim 1, wherein the mineral material comprises fiberglass.

6. The fire rated door of claim 1, wherein the mineral material comprises gypsum.

7. The fire rated door of claim 3, further comprising a first door skin adhered over the first layer of high-density fiberboard, and a second door skin adhered over the second layer of high-density fiberboard.

8. The fire rated door of claim 1, wherein the fire rated wood comprises fire rated particleboard.

9. The fire rated door of claim 7, further comprising a door jamb.

10. A laminated door core for a fire rated door, the laminated door core comprising:
- a center layer having a first side and an opposing second side, the center layer comprising fire rated wood,
- a first layer comprising a mineral material adhered to the first side of the center layer,
- a second layer comprising the mineral material adhered to the second side of the center layer,
- a first layer of high-density fiberboard adhered over the first layer of the mineral material, and
- a second layer of high-density fiberboard adhered over the second layer of the mineral material;
- wherein the center layer, the first layer of mineral material, and the second layer of mineral material each have approximately the same thickness.

11. The laminated door core of claim 10, wherein the mineral material comprises calcium silicate.

12. The laminated door core of claim 10, wherein the mineral material comprises fiberglass.

13. The laminated door core of claim 10, wherein the mineral material comprises gypsum.

14. The laminated door core of claim 10, wherein the fire rated wood comprises fire rated particleboard.

* * * * *